No. 757,903. PATENTED APR. 19, 1904.
T. P. FORD.
CONTROLLING DEVICE FOR MAINTAINING STEADY PRESSURE.
APPLICATION FILED DEC. 10, 1903.
NO MODEL. 2 SHEETS—SHEET 1.

No. 757,903. Patented April 19, 1904.

UNITED STATES PATENT OFFICE.

THOMAS P. FORD, OF NEW YORK, N. Y.

CONTROLLING DEVICE FOR MAINTAINING STEADY PRESSURE.

SPECIFICATION forming part of Letters Patent No. 757,903, dated April 19, 1904.

Application filed December 10, 1903. Serial No. 184,587. (No model.)

*To all whom it may concern:*

Be it known that I, THOMAS P. FORD, a citizen of the United States, and a resident of the city of New York, borough of Brooklyn, in the county of Kings and State of New York, have invented a new and Improved Controlling Device for Maintaining Steady Pressure, of which the following is a full, clear, and exact description.

The invention relates to controlling devices—such, for instance, as are used for operating the dampers of boilers or for starting and stopping pumps employed for pumping water into overhead tanks and the like.

The object of the invention is to provide a new and improved controlling device which is exceedingly sensitive and arranged to work quickly to change the position of the stopping and starting mechanism of the pump, damper, or other device to be controlled.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1:
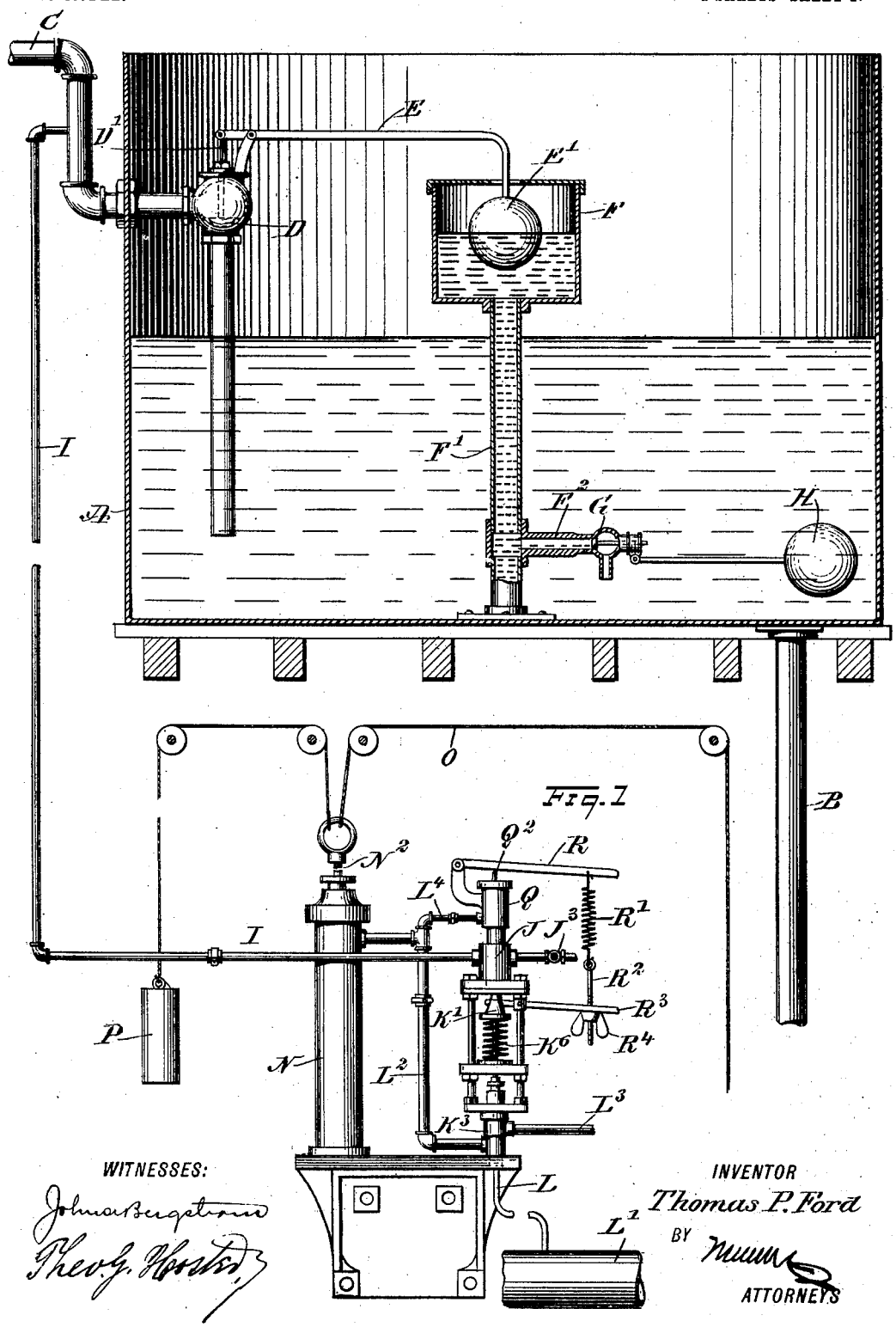
Figure 2:
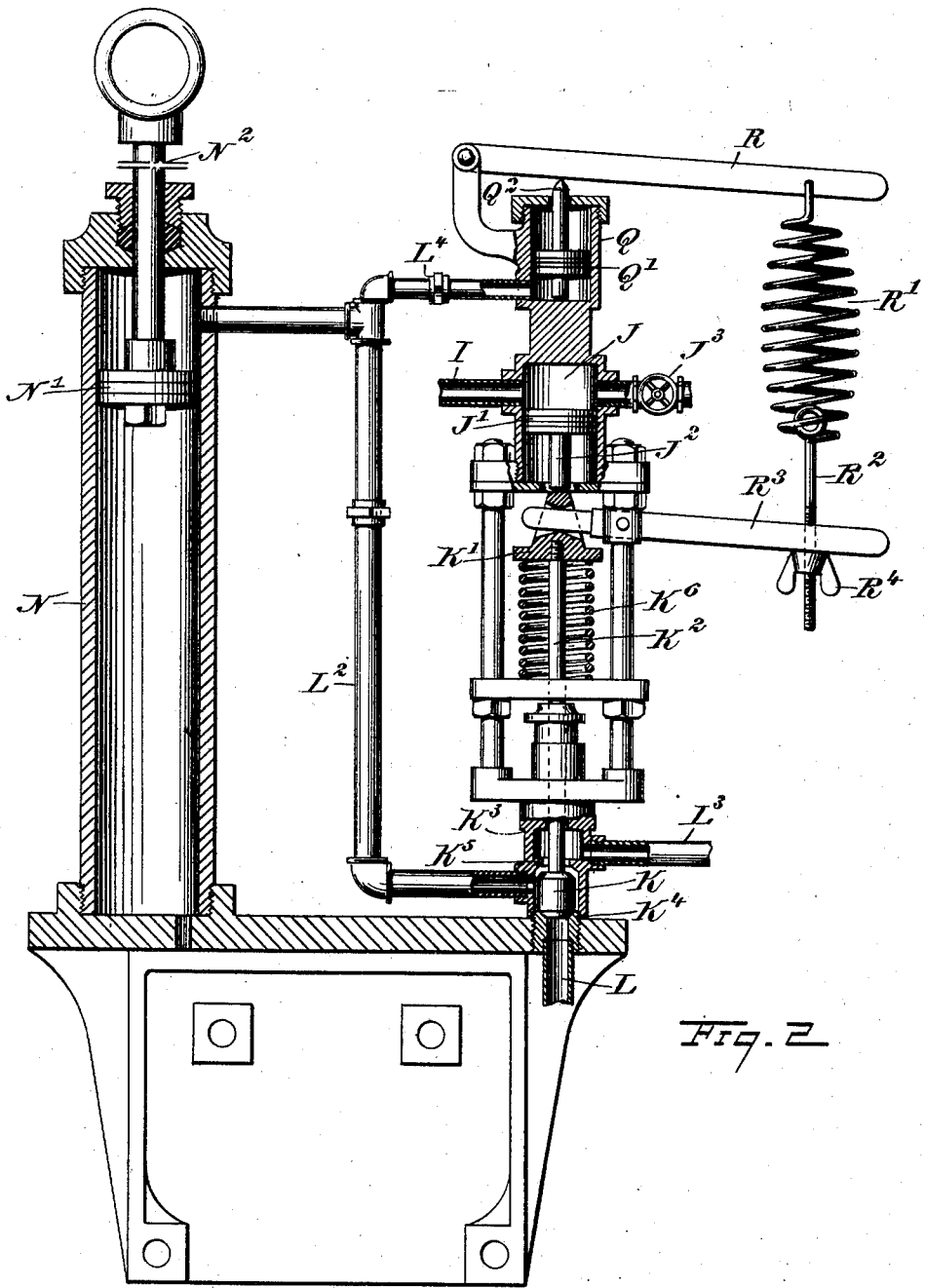

Figure 1 is a side elevation of the improvement as applied to means for filling an overhead water-tank, shown in section; and Fig. 2 is an enlarged sectional side elevation of part of the improvement.

The improvement as illustrated in the drawings is applied to a system for supplying water from an overhead or roof tank A, by way of a service-pipe B, to the different parts of a building, the said tank being filled with water by a pump (not shown) having its discharge-pipe C delivering into the tank A. The terminal of the discharge-pipe C is provided with a valve D, having its valve-stem D' connected with a lever E, carrying a float E', adapted to rise and fall with the water in a small auxiliary tank F, set in such relation to the main tank A that when the latter is filled to a predetermined high-water level then the water flows into the open top of the auxiliary tank F and fills the same for the float E' to rise and close the valve D in the discharge-pipe C, so that water is prevented from flowing by way of the discharge-pipe C into the tank A to cause an overflow thereof.

The bottom of the auxiliary tank F is provided with a discharge-pipe F', attached to the bottom of the main tank A and serving to support the auxiliary tank F the desired height within the main tank A, as plainly shown in Fig. 1. A valve G is arranged in the discharge-spout F² of the pipe F', and this valve G is connected with and controlled by a float H, rising and falling with the water in the main tank A. Thus when the main tank A is filled the valve G is held closed by the float H, and the water in the auxiliary tank F is thus retained.

When the level of the water in the main tank A falls below a predetermined low or minimum level, then the float H in falling opens the valve G to allow the water to discharge from the auxiliary tank F into the main tank A, whereby the float E' is caused to sink and open the valve D for refilling of the tank A on the subsequent and automatic starting of the pump, as hereinafter more fully described.

The discharge-pipe C of the pump is connected between the valve D and the pump by a pressure-pipe I with a pressure-cylinder J, containing a piston J', connected by a piston-rod J² with the head K' of the valve-stem K² of a valve K, contained in a casing K³, connected by a pipe L with a pressure-supply—such, for instance, as a street water-main L'—as indicated in Fig. 1. The casing K³ is also connected by a pipe L² with the upper end of a controlling-cylinder N, containing a piston N', having its piston-rod N² connected by a rope O or other mechanism with the part to be controlled—for instance, the stopping and starting device of the pump used for filling the tank A or with the damper of a steam-boiler or the like. In case an electrical pump is used then the rope O is connected with the switch for stopping and starting the pump, and in case a steam-pump is used the rope O is connected with the steam-admission valve, so as to open and close the same, as required. The piston-rod N² is also connected with a counterbalancing-weight P for moving the piston N' from its normal lowermost position quickly into an uppermost position as soon as the pressure in the cylinder N is released—that is, when the valve K is moved to its seat $K^4$, as shown in Fig. 2, to close the pipe L to the pipe $L^2$ and to connect the pipe $L^2$ by way of a valve-seat $K^5$ in the casing $K^3$ with a waste-pipe $L^3$. When the valve K is in an open position—that is, is seated on the valve-seat $K^5$—then it connects the pipes L and $L^2$ with each other, but closes the pipe $L^3$ to the pipe $L^2$, and consequently the pressure from the street-main or other source passes into the cylinder N and forces the piston N' therein into a lowermost position to keep the damper open or the stopping and starting mechanism in position for running the pump to pump water into the tank A. A spring $K^6$, coiled on the stem $K^2$, presses on the head K' to hold the valve K normally to its seat $K^5$ and off its seat $K^4$—that is, during the time the pump is pumping water into the tank A the pressure on the top of the piston J' is less than the tension of the spring $K^6$ and the latter forces the piston J' and the valve K against the seat $K^5$. When the pressure in the cylinder J against the top of the piston J' exceeds the tension of the spring, then the piston J' is forced down, and with it the valve K, to move the latter off the seat $K^5$ and upon the seat $K^4$.

When the tank A is filled, and with it the auxiliary tank F, as previously explained, and the valve D closed while the pump is still running, then the pressure in the discharge-pipe C passes, by way of the pressure-pipe I, into the pressure-cylinder J to force the piston J' therein downward, so as to move the valve K into a lowermost position, as shown in Fig. 2, to cut off the pipe L and to connect the pipe $L^2$ with the waste-pipe $L^3$ to relieve the cylinder N of the fluid-pressure and to allow the counterweight P to throw the piston N' into an uppermost position to reverse the position of the damper or that of the stopping and starting mechanism to stop the pump.

In order to counterbalance the piston J' and to allow of setting the same to any desired pressure, the following arrangement is made: The fluid-pressure pipe $L^2$ is connected by a branch pipe $L^4$ with a counterbalancing-cylinder Q, preferably set on top of the cylinder J and containing a piston Q', having its piston-rod $Q^2$ abutting against the under side of a lever R. The free end of the lever R is connected by a spring R' with a screw-rod $R^2$, held adjustably on one end of a lever $R^3$ by the operator adjusting a wing-nut $R^4$ on the said screw-rod $R^2$, and the said lever $R^3$ is connected with the head K' on the stem $K^2$ of the valve K so that when the piston J' is moved downward a swinging motion is given the lever $R^3$ to relieve the spring R' of tension, and thus allow a quick closing of the valve K. Now when the pressure on the piston J' in the cylinder J is released on the starting of the pump after the valve D has been opened then the valve K readily opens and the pressure from the street-main passing into the cylinder N forces the piston N' downward therein, and at the same time the pressure flows by way of the branch pipe $L^4$ into the counterbalancing-cylinder Q to push the piston Q' upward to impart an upward-swinging motion to the lever R, so as to place the spring R' again under tension to the amount to which the device is set by the operator adjusting the wing-nut $R^4$ correspondingly.

The cylinder J is provided with a blow-off valve or petcock $J^3$ for blowing off and cleaning the cylinder whenever it is desired to do so.

The operation is as follows: When the pump is running and the tank A is being filled with water by way of the discharge-pipe C, then the valve D is open until the auxiliary tank F is filled with water, as previously explained, and at the time the main tank A is filled, and when this takes place the valve D is closed, so that the pressure in the pipe C passes by way of the pipe I into the cylinder J to force the piston J' downward for moving the valve K onto its lowermost valve-seat $K^4$ to relieve the controlling-cylinder N of pressure and allow the counterweight P to actuate the stopping and starting device for stopping the pump. When the water in the tank A is used in the building and the level of the water in the tank A falls to a lowermost level, then the float H opens the valve G, so that the water is quickly discharged from the auxiliary tank F, whereby the valve D is opened, and consequently the pressure is relieved from the pressure-cylinder J and the spring $K^6$ forces the piston J' upward, so that the valve K is opened, and the piston N' is forced downward into a lowermost position by the fluid-pressure from the street-main, so that the pump is again started to refill the tank A.

From the foregoing it will be seen that the stopping and starting device of the pump is not thrown into action until the tank A has either been completely filled or emptied to a predetermined low level and then the change is made suddenly and positively and no fluctuation is had, owing to the use of the auxiliary tank F and the floats E' and H, as above described.

It will be further seen that a very sensitive action is provided and the operation is controlled by the motive power in the pipe C from the pressure to be controlled. It is further understood that the pressure in the pipe I is practically dead until the valve E in the pipe C is closed and the pump keeps on pumping to send the pressure by way of the pipe I into the pressure-cylinder J.

Having thus described my invention, I claim as new and desire to secure by Letters Patent—

1. A controlling device of the class described, comprising a controlling-piston, connected with the part to be controlled and under the influence of the pressure-supply, a pressure-cylinder containing a piston, under the influence of the pressure of the device to be controlled and controlling a valve in the said pressure-supply, and a counterbalancing-cylinder having a piston, controlled by the pressure for the said controlling-piston and connected with the said valve, as set forth.

2. A controlling device of the class described, comprising a tank, a tank-supply pipe for filling the tank with water, a float-controlled device for operating the valves in the said tank-supply pipe, a pressure-pipe leading from the said tank-supply pipe, a pressure-cylinder containing a piston and into which leads the said pressure-pipe, a controlling-cylinder, a piston therein, connected with the device to be controlled, and a pressure-supply for the said controlling-cylinder and containing a valve controlled by the said piston in the pressure-cylinder, as set forth.

3. A controlling device of the class described, comprising a tank, a tank-supply pipe for filling the tank with water, a float-controlled device for operating the valves in the said tank-supply pipe, a pressure-pipe leading from the said tank-supply pipe, a pressure-cylinder containing a piston and into which leads the said pressure-pipe, a controlling-cylinder, a piston therein, connected with the device to be controlled, a pressure-supply for the said controlling-cylinder and containing a valve controlled by the said piston in the pressure-cylinder, a counterbalancing-piston, under the influence of the pressure from the said pressure-supply, and a spring-controlled lever connection between the said counterbalancing-piston and the valve in the pressure-supply, as set forth.

4. A controlling device of the class described, provided with a service-tank, a supply-pipe for the tank, having a valve, a mechanism for actuating the said valve suddenly on the water reaching a predetermined high level or a predetermined low level in the said tank, a pressure-pipe leading from the said tank-supply pipe, and mechanism for actuating the part to be controlled, the said mechanism being controlled by the pressure in said pressure-pipe, as set forth.

5. A controlling device provided with a service-tank, a supply-pipe for the tank, having a valve, an auxiliary tank, adapted to be filled from the service-tank when the water reaches a maximum level in the service-tank, means for controlling the outflow of the water from the auxiliary tank at the time the water in the main tank reaches a predetermined low level, a float device in the auxiliary tank, connected with the said valve in the supply-pipe, for controlling the supply of the water to the tank, a pressure-pipe leading from the tank-supply pipe, a pressure-cylinder having a piston and connected with the said pressure-pipe, and a fluid-controlled device for actuating the part to be controlled, the pressure for said fluid-controlled device being controlled from the piston in the pressure-cylinder, as set forth.

6. A controlling device of the class described, provided with a pressure-cylinder having a piston and connected with a pressure-pipe, a fluid-controlled device, for actuating the part to be controlled and having a pressure-supply pipe containing a valve controlled by the piston in the said pressure-cylinder, and a counterbalancing-cylinder having a piston and connected with the said pressure-supply pipe for the said fluid-controlled device, as set forth.

7. A controlling device of the class described, provided with a pressure-cylinder having a piston and connected with a pressure-pipe, a fluid-controlled device, for actuating the part to be controlled and having a pressure-supply pipe containing a valve controlled by the piston in the said pressure-cylinder, a counterbalancing-cylinder having a piston and connected with the said pressure-supply pipe for the said fluid-controlled device, and a spring-pressed lever device, for connecting the piston in the said counterbalancing-cylinder with the said valve in the supply-pipe, as set forth.

8. A controlling device of the class described, provided with a pressure-cylinder having a piston and connected with a pressure-supply pipe, a fluid-controlled device, for actuating the part to be controlled and having a pressure-supply pipe containing a valve controlled by the piston in the said pressure-cylinder, a counterbalancing-cylinder having a piston and connected with the said pressure-supply pipe for the said fluid-controlled device, and a spring-pressed lever device, for connecting the piston in the said counterbalancing-cylinder with the said valve in the supply-pipe, the said spring-pressed lever device comprising a lever pressed on by the piston in the counterbalancing-cylinder, a lever connected with the stem of the said valve and a spring connecting the levers with each other, as set forth.

9. A controlling device of the class described, provided with a pressure-cylinder having a piston and connected with a pressure-supply pipe, a fluid-controlled device, for actuating the part to be controlled and having a pressure-supply pipe containing a valve controlled by the piston in the said pressure-cylinder, a counterbalancing-cylinder having a piston and connected with the said pressure-supply pipe for the said fluid-controlled device, and a spring-pressed lever device, for connecting the piston in the said counterbalancing-cylinder with the said valve in the supply-pipe, the said spring-pressed lever device comprising a lever pressed on by the piston in the counterbalancing-cylinder, a lever connected with the stem of the said valve, a spring connecting the levers with each other, and means for adjusting the tension of the spring, as set forth.

10. A controlling device of the class described, provided with a main pressure-cylinder and a counterbalancing-cylinder, each cylinder containing a piston and the piston in the main pressure-cylinder controlling the valve in the supply-pipe for the said counterbalancing-cylinder, a lever connected with the piston in the counterbalancing-cylinder, a lever connected with the stem of the said valve, and a spring connecting the levers with each other, as set forth.

In testimony whereof I have signed my name to this specification in the presence of two subscribing witnesses.

THOMAS P. FORD.

Witnesses:
   THEO. G. HOSTER,
   EVERARD BOLTON MARSHALL.